Nov. 22, 1960

R. V. STARR 2,961,067

ELECTRICALLY OPERATED STORED ENERGY
SYSTEM FOR CIRCUIT BREAKERS

Filed Nov. 12, 1958

INVENTOR.
ROBERT V. STARR

BY
ATTORNEYS

INVENTOR.
ROBERT V. STARR

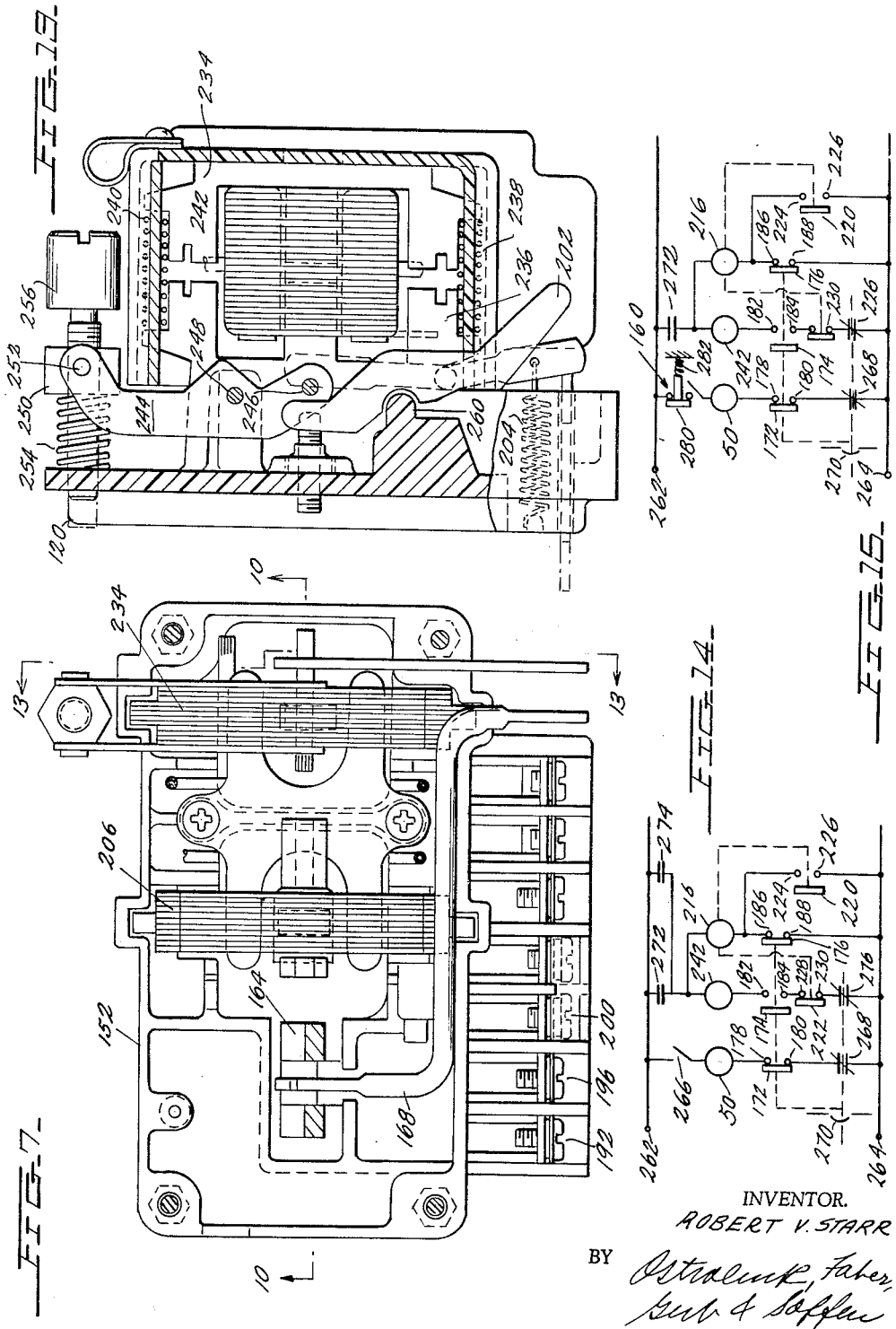

Nov. 22, 1960 R. V. STARR 2,961,067
ELECTRICALLY OPERATED STORED ENERGY
SYSTEM FOR CIRCUIT BREAKERS
Filed Nov. 12, 1958 7 Sheets-Sheet 6
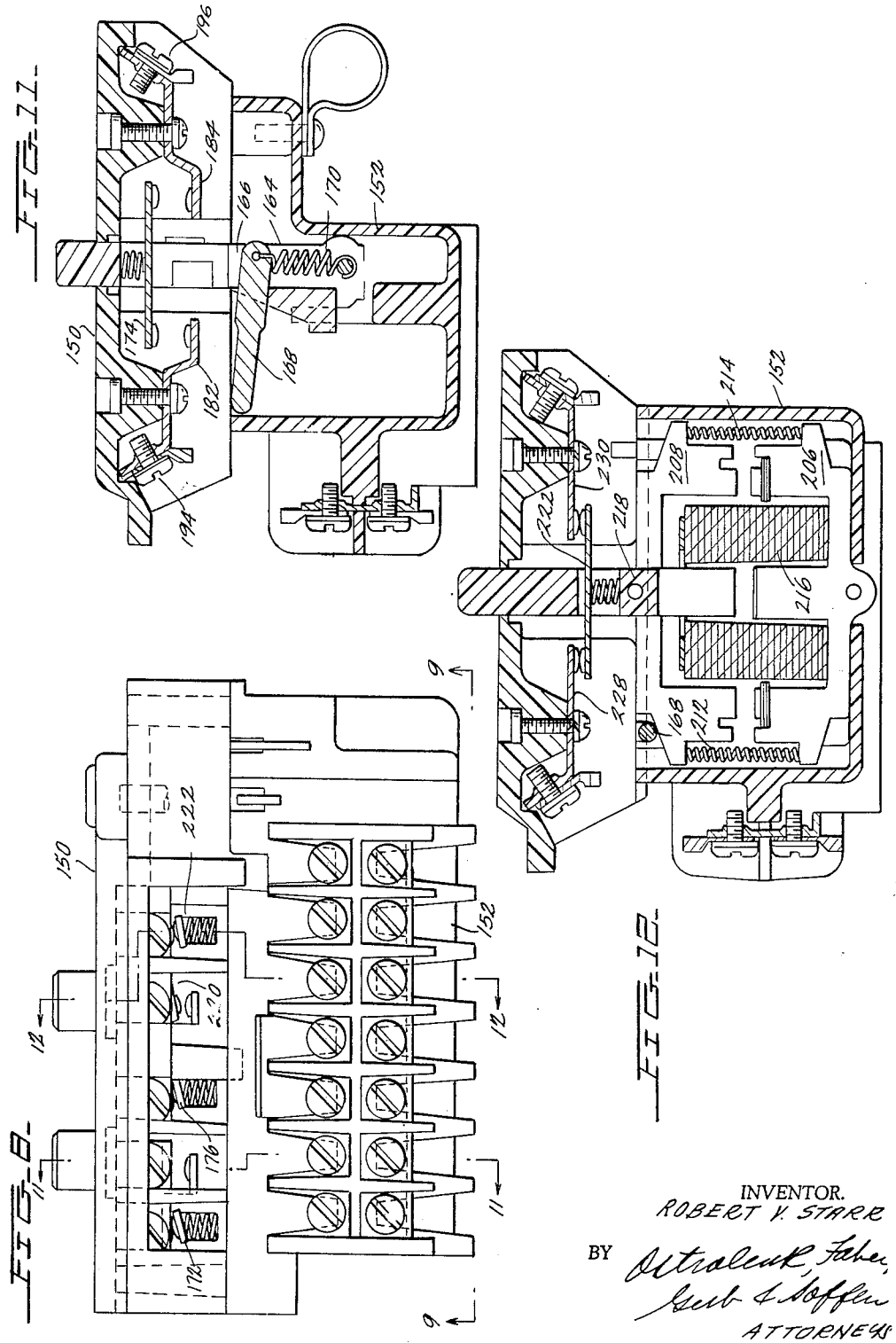
INVENTOR.
ROBERT V. STARR
BY
ATTORNEYS

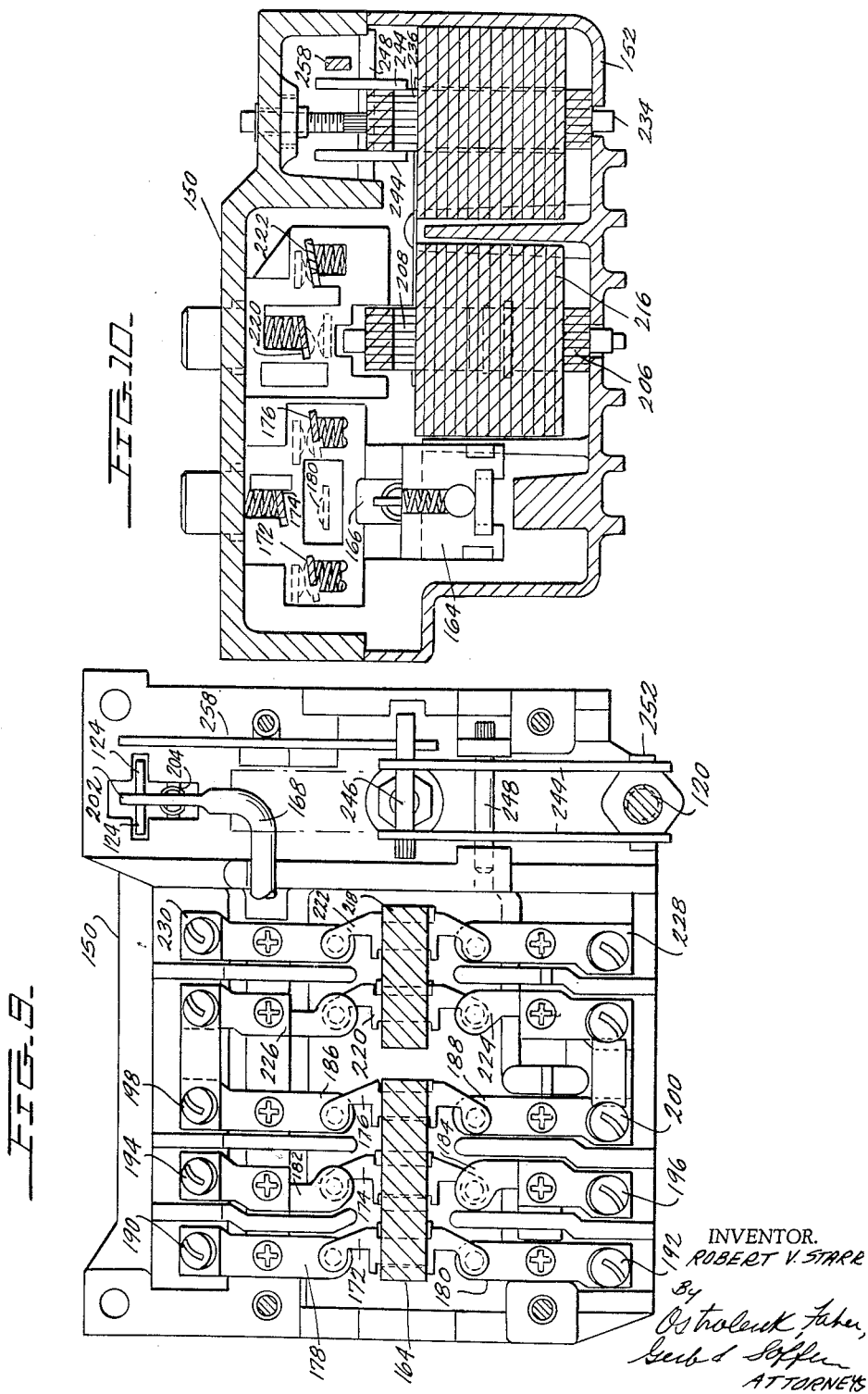

United States Patent Office 2,961,067
Patented Nov. 22, 1960

2,961,067

ELECTRICALLY OPERATED STORED ENERGY SYSTEM FOR CIRCUIT BREAKERS

Robert V. Starr, E. Pikeland Township, Chester County, Pa., assignor to I-T-E Circuit Breaker Company, Philadelphia, Pa., a corporation of Pennsylvania Filed Nov. 12, 1958, Ser. No. 773,331

16 Claims. (Cl. 185—40)

This invention relates to a stored energy spring closing mechanism for circuit breakers and is more specifically directed to a spring closing mechanism which can be charged by electrical or manual operating means.

In the novel spring closing mechanism of the invention, the closing spring may be charged by a relatively small motor which oscillates a charging lever which in turn causes a charging of the spring. By making the oscillation of a relatively small amplitude, the size of the charging means may be substantially reduced because of the short stroke required. This novel oscillatory charging mechanism further permits a simplified manual operation of the mechanism for emergency conditions or for testing.

The springs of the mechanism may be discharged only after being fully charged to some predetermined position so that a uniformly high closing speed is imparted to the circuit breaker contacts regardless of the line conditions, low control voltage or loss of control voltage for the circuit breaker and the circuit breaker may always be closed and latched against its short-time delay trip current.

A uniform amount of energy is available for any closing operation since my novel mechanism permits the same fully charged position of the spring prior to its discharge under any condition. Furthermore the charging position of the closing mechanism and its discharge is independent of the motor and various factors which affect the motor such as lubricant temperature and motor voltage, which has previously caused a variable drag on the closing mechanism.

A two stage closing cam action wherein one of the cams is a part of a collapsible mechanism is then provided so that the force-displacement curve of the closing springs may be accurately matched to the force-displacement curve of the circuit breaker opening springs in much the same manner as described in my copending application Serial No. 773,332, filed November 12, 1958, entitled Spring Closing System for Circuit Breakers, and assigned to the assignee of the instant invention.

The closing springs of my invention are normally in a discharged condition and the closing cycle includes a first portion in which the springs are charged by a motor. When the springs are fully charged, they may be automatically discharged to transfer their energy to the circuit breaker contacts or they may be held in a charged condition until such time as an operator cares to discharge them.

The mechanism is preferably controlled by a motor closing control means of the type set forth in copending application Serial No. 773,468, filed November 12, 1958, in the names of Charles J. Yarrick and Einar H. Fredrickson, entitled Control Mechanism for Spring Close Circuit Breakers, and assigned to the assignee of the instant invention.

Accordingly a primary object of this invention is to provide a novel spring closing mechanism for circuit breakers.

Another object of this invention is to provide a novel spring closing mechanism for circuit breakers wherein the springs may be charged to a predetermined charging position by electrically operated means.

Another object of this invention is to provide a novel charging mechanism for the springs of a spring closing mechanism which can be automatically operated by electric means or by manual means.

Still another object of this invention is to provide a novel spring closing mechanism for circuit breakers wherein a motor initially charges the springs and when the springs are charged to a predetermined position, they are either automatically discharged independently of the motor or are held charged until a later time.

Another object of this invention is to provide a novel spring closing mechanism for circuit breakers wherein a two stage latch system is provided as a holdup latch to prevent discharge of the springs until they are charged to some predetermined value.

These and other objects of this invention will become apparent from the following description taken in conjunction with the drawings, in which—

Figure 2a illustrates a modification of a discharge control for the mechanism of Figures 1 and 2 wherein the discharge is manually controlled by the physical motion of the electrical close switch, supplementing the function of the closing relay.

Figure 6 illustrates the mechanism of Figures 4 and 5 when the circuit breaker trip latch has been operated and the circuit breaker contacts are disengaged.

Figure 7 is a top view of the lower half of the control structure of Figures 1 and 2.

Figure 8 is a front view of the control structure of Figures 1 and 2.

Figure 9 is a bottom view of the upper housing of the control mechanism of Figures 1 and 2 and particularly illustrates the contact structure.

Figure 10 is a cross-sectional view of the control structure of Figure 7 taken across the lines 10—10.

Figure 11 is a side cross sectional view of Figure 8 taken across the lines 11—11 and particularly illustrates the limit switch mechanism.

Figure 12 is a further cross sectional view of Figure 8 taken across the lines 12—12 and particularly illustrates the lockout relay mechanism.

Figure 13 is a cross sectional view of Figure 7 taken across the lines 13—13 and particularly illustrates the latch release mechanism.

Figure 14 is a first embodiment of the electrical connection of the control mechanism and spring charging motor.

Figure 15 is a second embodiment of a control circuit of the type shown in Figure 14.

Spring closing mechanism

Figure 3:
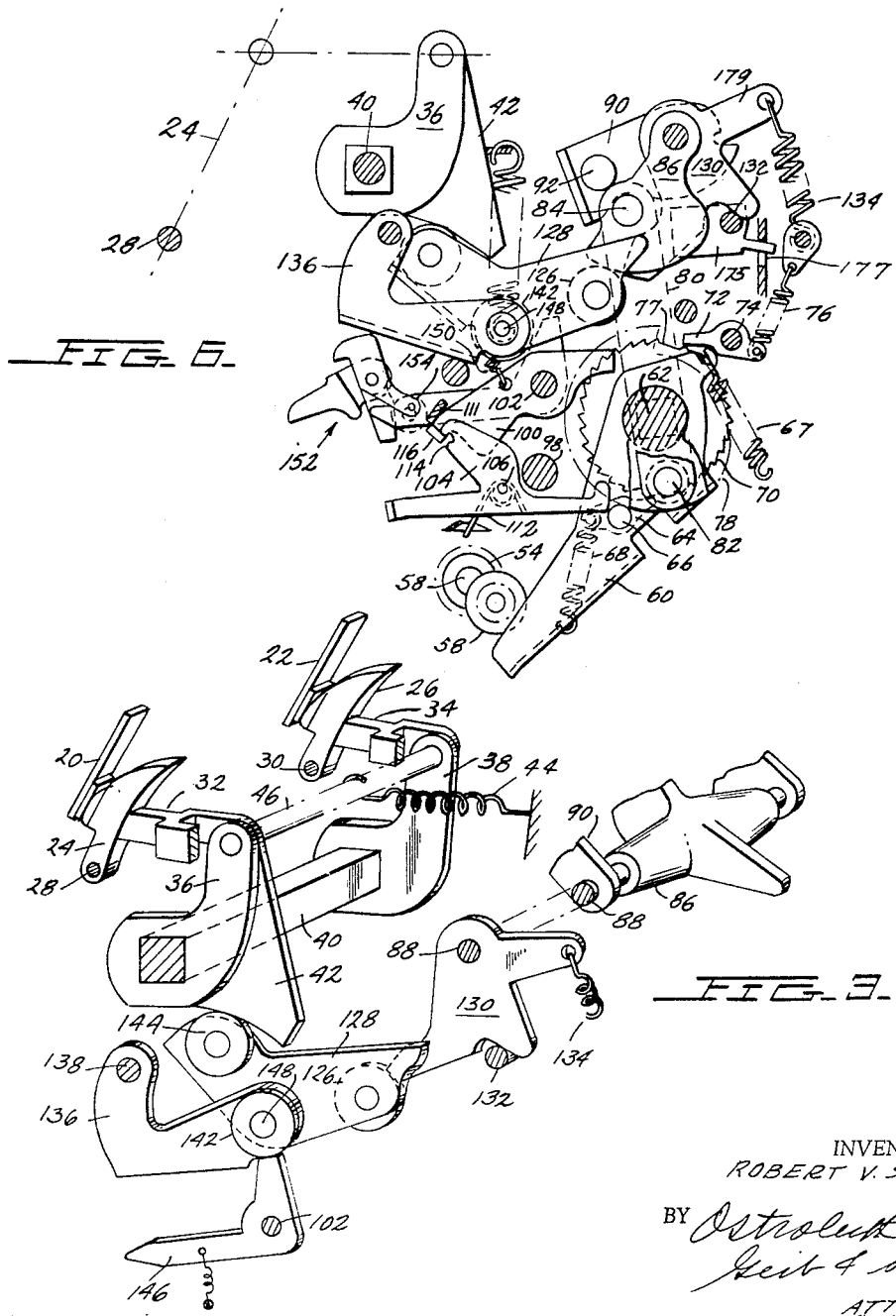
Figure 3 illustrates a continuation of the structure of Figures 1 and 2 and shows the connection in perspective view from the first stage closing cam to the circuit breaker contacts.
Figure 4:
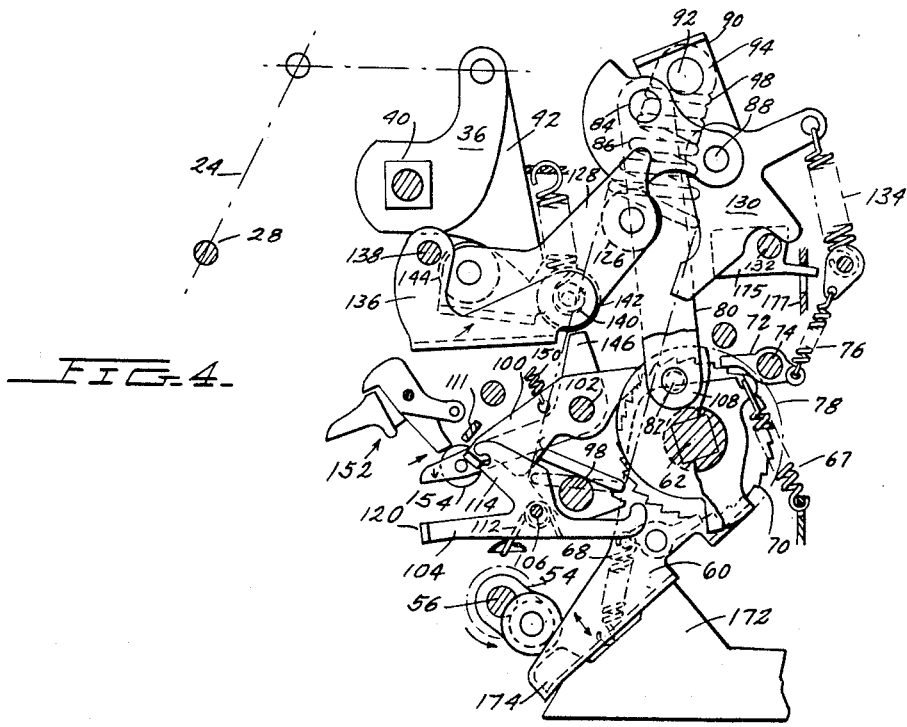
Figure 4 is a side view of the operating mechanism of Figures 1 and 3 where the circuit breaker contacts are open and the operating mechanism is in an active position.
Figure 5:
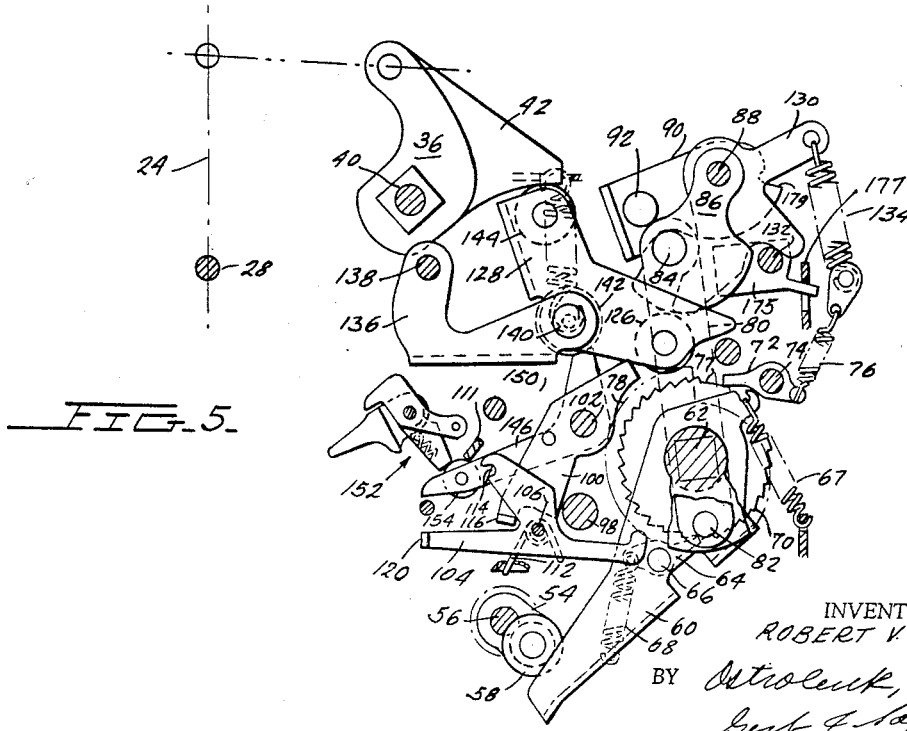
Figure 5 is similar to Figure 4 and illustrates the mechanism position immediately after contact closing.

Referring first to Figure 3, the invention is applicable to any type of circuit breaker and the circuit breaker is schematically illustrated here as including first and second stationary contacts 20 and 22 which cooperate with respective movable contacts 24 and 26 which are pivotally mounted at pivots 28 and 30 respectively. The pivot point 28 and movable contact 24 is schematically illustrated in Figures 4, 5 and 6 to indicate the position of the movable contact in these figures. Each of movable contacts 24 and 26 are pivotally connected to operating links 32 and 34 respectively which are pivotally connected at their opposite ends to operating arms 36 and 38 respectively. Operating arms 36 and 38, along with the operating arm of any other pole are then connected through a common jack shaft 40 in the usual manner. It is to be understood that the circuit breaker set forth above may be of any desierd type and a specific structure set forth is there for purposes of illustration only. Thus, the circuit breaker could be a single pole or multipole unit and could be of any type which would require a spring closing mechanism.

The operating arm 36 is provided with a rearwardly extending cam member 42 which, as will be described hereinafter, is the second stage closing cam of the closing mechanism. This closing mechanism will close the movable contacts 24 and 26 against the force of their opening bias spring such as the opening bias spring 44 which is fixed at one end and is terminated at its other end of shaft 46 which is pivotally connected to the tops of contact arms 36 and 38.

Figure 1:
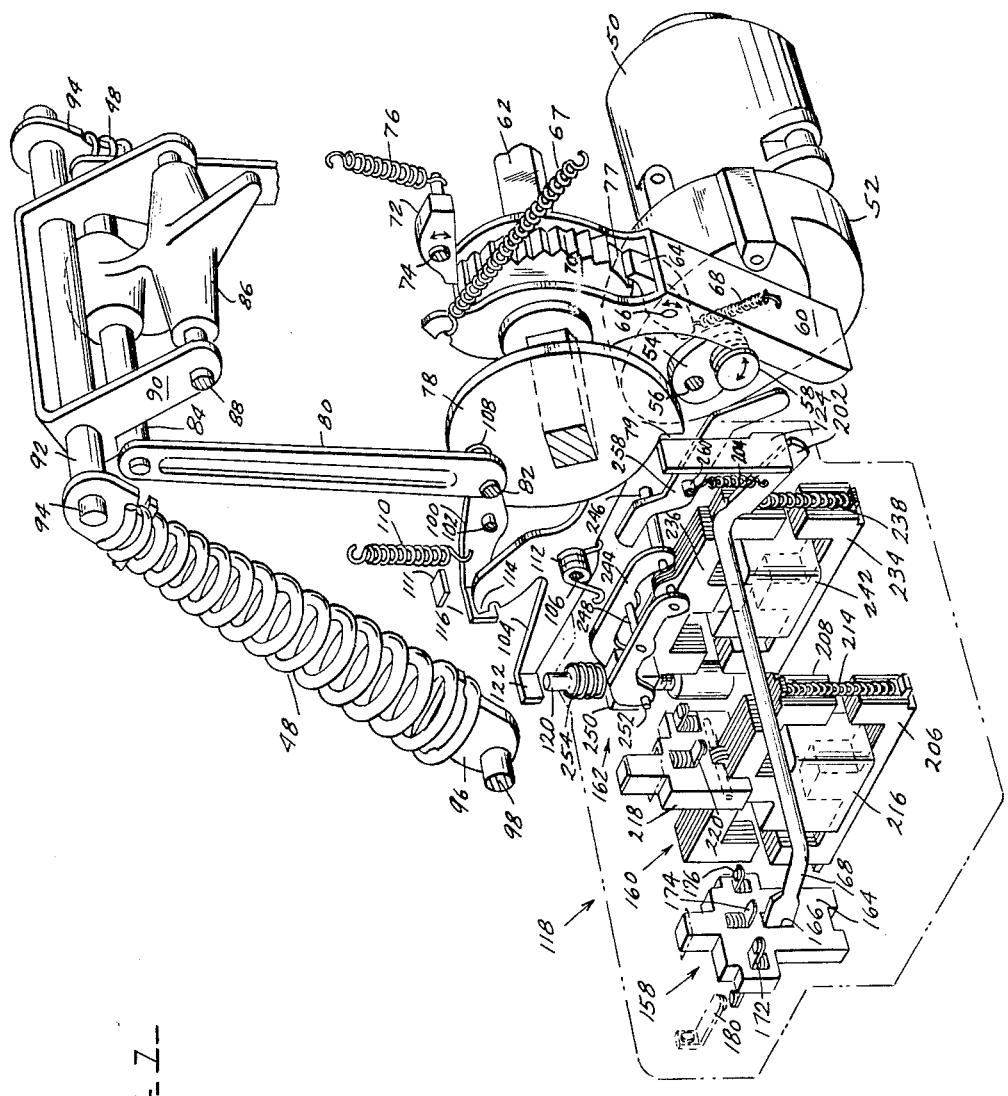
Figure 1 illustrates a perspective view of the closing control mechanism in conjunction with the charging structure up to the point of the first stage closing cam where the charging spring is in its charged position.
Figure 2:
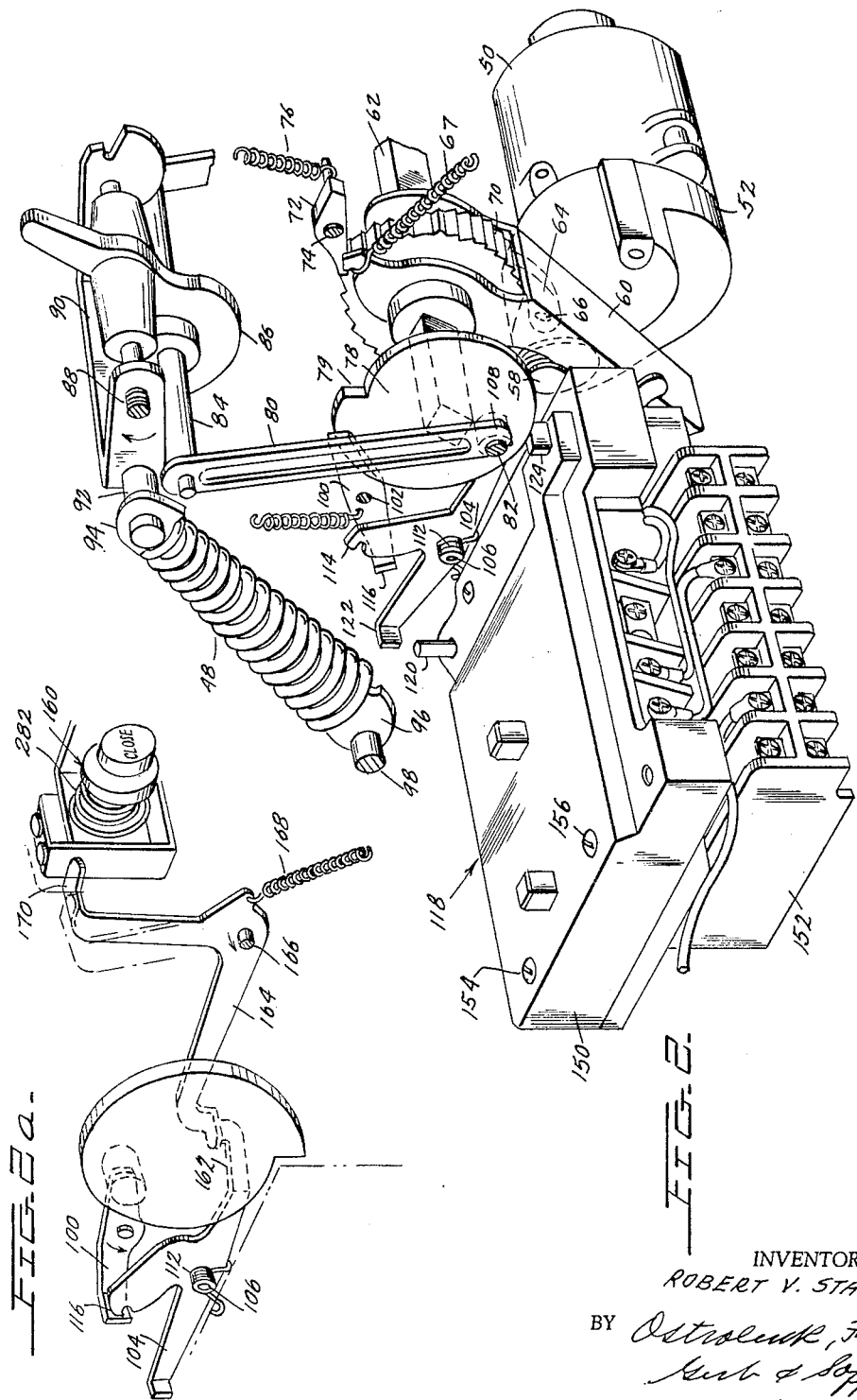
Figure 2 is similar to Figure 1 where the control structure is contained within its housing, and the mechanism is in a discharged position.

The operating mechanism as is best seen in Figures 1, 2 and 4 includes energy storing springs 48 which are operatively connected to cam member 42 and are extendible from the position of the Figure 2 to the position of Figures 1 and 4 and are latchable in the extended position so as to be discharged at an appropriate time. The mechanism by which the spring 48 is operatively connected to cam 42 will be described more fully hereinafter.

The charging means for charging the spring is shown in Figures 1 and 2 and includes an operating means or an electrically energizable means such as motor 50 which has a gear reduction box 52 at its output where the output of gear box 52 drives an arm 54 or a charging mechanism in a counter-clockwise direction about the output shaft 56. The outer end of arm 54 carries a roller 58 which as will be presently seen, oscillates a pawl carrier 60. Pawl carrier 60 is pivotally mounted on relatively stationary shaft 62 and pivotally carries a drive pawl 64 on pivot 66. The biasing spring 67 biases pawl carrier 60 in a clockwise direction and tends to maintain pawl carrier 60 in engagement with roller 58. Drive pawl 64 is biased in a counter-clockwise direction about its pivot 66 by biasing spring 68 which is connected between the lower end of drive pawl 64 and the pawl carrier 60. Spring 68 more specifically biases drive pawl 64 towards engagement with a ratchet wheel 70 which is carried in the same shaft 62 which carries the pawl carrier 60. Ratchet wheel 70 is further associated with a holding pawl 72 which is pivotally mounted on a relatively fixed pivot 74 and is biased in a counter-clockwise direction by the biasing spring 76. Ratchet wheel 70 further has a skipped tooth or flat portion 77 as will be described later.

The shaft 62 has an output crank member 78 which is pivotally connected to a link 80 through the pivot connection 82. The upper end of link 80 is pivotally connected to shaft 84 which in turn is pivotally connected to the first stage closing cam 86. The first stage closing cam 86 is then pivotally mounted on a fixed shaft 88 which further pivotally mounts a U-shaped spring carrier 90 which has its opposite end pivotally connected to shaft 92. Shaft 92 which is operatively connected to the contacts or any other type load is connected to the upper spring carriers 94 each of which supports a respective spring 48 at their upper ends. The bottom of the springs 48 are then connected in the usual manner to lower spring carriers such as lower spring carrier 96 which are supported from a fixed support member such as shaft 98.

A latch means or latch mechanism for latching the springs 48 in their charged condition is comprised of a two stage latch which includes a primary close latch 100 which is pivotally supported on fixed pivot 102 and a secondary close latch 104 which is pivotally mounted on a fixed pivot 106. The primary close latch 100 cooperates with a roller 108 which is carried on shaft 82 as shown in Figures 1 and 4 and is biased to rotate in a clockwise direction about pivot 102 by the biasing spring 110, its motion being limited by stop 111. Secondary closing latch 104 is biased to rotate in a counter-clockwise direction by torsion spring 112 and has a latch surface 114 which is engageable with leg 116 of primary closing latch 100.

The latch control means is comprised of a control mechanism generally seen as control mechanism 118 in Figures 1 and 2 which will be fully described later in the application where the control means 118 includes a plunger member 120 which cooperates with the rearwardly extending leg 122 of secondary close latch 104. A second member of control means 118 which cooperates with the operating mechanism is the limit switch actuator 124 (Figures 1 and 2) which operates to control motor 50 in the manner which will be described hereinafter. The limit switch actuator 124 cooperates with the cam surface of crank 78 so that the switch is activated when the end of the cam surface or portion 79 of crank 78 is reached.

As shown in Figure 3, first stage closing cam 86 is operatively connected to the roller 126 which is pivotally carried by collapsible link 128. As further shown in Figures 3, 4, 5 and 6, the prop latch 130 is pivotally supported by pivot 88 and is biased to rotate in a clockwise direction against stop 132 by the biasing spring 134. Collapsible link 128 is pivotally carried by carrier link 136 which is pivotally supported from fixed pivot 138. Carrier link 136 has its right hand end pivotally connected to link 128 through the pivot pin 148 which further supports roller 142. The left hand end of link 128 is then terminated by a pivotally supported roller 144 which engages the cam surface 42 of operating arm 36.

Collapsible link 128 is normally held in a force transmitting position by means of the trip latch mechanism which includes a main latch 146 which is pivotally mounted on the same fixed shaft 102 which carries the primary close latch 100. The main latch member 146 is biased in a counter-clockwise direction by the biasing spring 150 of Figures 4, 5 and 6 and is normally prevented from rotating in this direction by the trip latch structure generally seen by numeral 152 which latches roller 154 carried on the left hand end of main latch 146. The trip latch structure 152 is of the normally used type and is described in copending application Serial No. 773,332, filed November 12, 1958, entitled Spring Closing System for Circuit Breakers and assigned to the assignee of the instant invention. It is sufficient for the purpose of the instant invention to understand that the trip latch 152 may be moved to the position of Figure 6 under various influences whereby the main latch 146 is free to rotate in a clockwise direction.

Operation of closing mechanism

Assume that the circuit breaker contacts are open and the operating mechanism is in its inactive position as shown in Figure 6. The closing is initiated by energization of motor 50. Energization of motor 50 will cause shaft 56 and its output arm 54 to rotate in a counter-clockwise direction as indicated by the arrow in Figure 1. As the operating arm 54 rotates, the roller 58 will impart an oscillatory motion to pawl carrier 60 about its mounting shaft 62. This oscillatory motion will bring pawl 64 into engagement with the teeth of ratchet wheel 70 whereby the oscillation from left to right of pawl 64 will move ratchet wheel 70 through a distance slightly longer than one tooth. Once the ratchet wheel 70 is moved this distance, the holding pawl 72 will move into a blocking position with respect to another tooth adjacent thereto to thereby hold the ratchet wheel 70 in position while the driving pawl 64 moves to the left to pick up a new tooth. In this manner, the ratchet wheel 70 and thus the crank arm 78 is rotated counter-clockwise from the position of Figures 2 and 6 to the position of Figure 1.

Since the link 80 is carried by crank arm 78, link 80 will be driven upwardly to cause rotation of carrier 90 in a clockwise direction about fixed shaft 88 to thereby extend spring 48 which is fixed at shaft 98 at its bottom. This motion continues over a first distance until the pivot point 82 first passes a dead center position over shaft 62 at which time roller 108 of crank 78 is brought into latching engagement with primary close latch 100. At the same time limit switch actuator 124 is released by the cam surface of crank 78 and operates its limit switch to de-energize motor 50 while the driving pawl 64 has moved into the flat tooth area 77 to be incapable of imparting a force to shaft 62. Hence, the springs 48 are charged to a predetermined condition.

Actuation of plunger 120 as will be described more fully hereinafter, will cause it to engage extension 122 of secondary closing latch 104 to rotate latch 104 in a clockwise direction as seen in Figure 5. This rotation will remove latch surface 114 of secondary close latch 104 from extension 116 of primary closing latch 100 to thereby allow the primary closing latch 100 to be cammed upwardly to rotate in a counter-clockwise direction by roller 108 through the spring force of closing springs 48. Thus, the link 80 is driven from spring 48 through the carrier 90 and shaft 84 in a downward direction to drive cam 86 in a counter-clockwise direction until it reaches the bottom of its travel as shown in Figure 2 and the spring 48 is fully discharged. During this rotation, ratchet 70 rotates freely with respect to pawls 64 and 72 so that the discharge of the springs 48 is independent of the motor 50.

As the springs 48 discharge and drive the carrier 90 downwardly, the first stage closing cam 86 is rotated in a counter-clockwise direction about shaft 88. The cam surface of first stage closing cam 86 will therefore drive roller 126 downwardly as seen in Figure 5 so that collapsible link 128 is rotated about pivot point 140, it being assumed that latch 146 is in its latching position. The clockwise rotation of carrier 128 will cause the roller 144 to move along the second stage closing cam 42 of contact arm 36 so as to drive the contacts to their engaged position as shown in Figure 5.

It is to be noted that this novel structure utilizes a first and second stage closing cam mechanism whereby the force-displacement characteristic of the opening spring 44 of Figure 3 can be closely matched to the closing springs 48 of the spring closing mechanism. Furthermore, the high latch forces required to latch the spring 48 in its charged condition are substantially reduced through the use of the two stage latch including primary closing latch 100 and secondary closing latch 104.

While the contacts are being driven to their closed position, the roller 126 will move downwardly and into engagement with the lower leg of prop latch 130. This will cause prop latch 130 to be cammed in a counter-clockwise direction against the biasing force of spring 134 until roller 126 moves below the bottom leg of the prop latch 130. Once roller 126 passes the bottom leg of prop latch 130, the biasing spring 134 rapidly resets the prop latch 130 so that its bottom leg moves into the blocking position of Figure 5 to prevent the return of carrier roller 126.

If during the closing operation the circuit breaker contacts close on a fault or if during normal operation there is a fault along the line, the trip latch 152 will be operated to the position of Figure 6 to release main latch 146. This will allow the main latch 146 to rotate in a clockwise direction as shown in Figure 6 so that the collapsible link 128 is no longer supported at pivot 148. The reaction of roller 142 on the eccentric support surface of the main latch 146 produces this motion. The opening springs 44 will drive the circuit breaker contacts to a disengaged position with carrier 128 rotating in the manner defined by the point of engagement of roller 144 and cam 142 and the permissible line of movement of pivot 148 about its fixed pivot 138. Thus, the mechanism is made trip-free and the circuit breaker contacts can disengage independently of the closing mechanism. Note that this motion will bring the roller 126 to the left of the extension of prop latch 130 so that the mechanism may be simply reset with roller 126 moving upwardly and past the prop latch 130. Note also that latches 100 and 104 will automatically reset after roller 108 of crank 78 is released and plunger 120 is withdrawn, by the latch biasing spring 110 which pulls latch 100 clockwise to cam latch 104 to its latching position.

In the structure described heretofore, the closing operation proceeded because of operation of plunger 120. Figure 2a illustrates an embodiment in which the springs are discharged responsive to the operation of manual closing button 160 which, as will be seen hereinafter, may also operate as part of a lockout means to prevent possible false closing cycles, or pumping. In Figure 2a, the secondary close latch 104 is provided with a rearwardly extended portion 162 in Figure 2a which cooperates with link 164 which is pivotally mounted at fixed pivot 166 and is biased to rotate in a clockwise direction by biasing means 168. The upper end of link 164 has a portion 170 which cooperates with button 160 so that the link 164 will be rotated counterclockwise when button 160 is depressed. This counter-clockwise rotation will cause a clockwise rotation of secondary close latch 104 about its pivot 106 to thereby unlatch the primary close latch 100 in a manner identical to that described above whereby the circuit breaker contacts are ultimately operated to a closed position.

Since this novel spring close mechanism is actuated through the reciprocating motion of pawl carrier 60, the closing mechanism may be charged by a manual operating lever as well as a motor. This is shown in Figure 4 where lever 172 is a manual operating lever. Lever 172 has an extending hook 174 which engages a cooperating slot (not shown) in pawl carrier 60 whereby a rocking motion of handle 172 will cause the charging of the springs in an identical manner by that achieved by motor 50. Thus, the circuit breaker contacts may be manually closed under normal or emergency conditions. Furthermore, it allows the operating mechanism to be inspected during a prolonged manual closing operation where the motion of spring carrier 90 is defeated and latch 100 is defeated.

This is accomplished by a blocking member 175, shown in Figures 4, 5 and 6, which is pivotally mounted on pivot 132 and has an extending portion reaching through an aperture in wall 177 so as to be accessible to an operator. By rotating spring blocking member 175 clockwise when spring carrier 90 is in the position of Figure 4, the blocking member will move behind surface 179 of spring carrier 90 (Figures 5 and 6) to thereby prevent motion of the spring carrier 90. It is then possible to slowly operate the mechanism through its closing cycle by means of operating handle 172 which will slowly rotate shaft 62 independently of motor 50.

Control mechanism

The control mechanism generally seen at numeral 118 is contained within an upper housing 150 and a lower housing 152 as generally seen in Figure 2. The lower housing 152 contains the solenoid and magnetic structures for the various control elements as will be described hereinafter in connection with Figures 1 and 7 while the upper housing which as will be described more fully hereinafter in connection with Figures 1 and 9 contains the contact structures of the magnetic structures of the lower housing 152. The upper and lower housings 150 and 152 are as shown in Figure 2, removably connected by any desired fastening means such as the screws 154 and 156 of Figure 2. Thus the fastening screws are easily connected and disconnected so that maintenance personnel can lift the upper housing 150 away from lower housing 152 and gain access to the control mechanism.

The control housing generally contains, as seen in Figure 1, a limit switch mechanism 158, a lockout relay mechanism 160 and a latch release mechanism 162.

The limit switch mechanism 158 is best seen in Figures 1, 7, 10 and 11 and is composed of a movable contact carrier 164, which is carried within an appropriate cooperating aperture of bottom housing 152. The contact carrier 164 has an aperture 166 extending therethrough (Figures 1, 10 and 11) which receives one end of a limit switch crank 168. Limit switch crank 168 is pivotally carried in lower housing 152 and, as best seen in Figure 11, is flexibly connected to the contact carrier 164 by means of biasing spring 170. Hence, a rotary movement of crank 168 will move the carrier 164 upwardly or downwardly along a line guided by the molding of the lower housing 152.

Contact carrier 164 flexibly carries bridging contacts 172, 174 and 176 as is best seen in Figures 1, 9, 10 and 11. Bridging contact 172 cooperates with a pair of stationary contacts 178 and 180 which are supported from the upper housing 150 and as shown in Figures 8 and 11, bridging contact 174 cooperates with stationary contacts 182 and 184 while the bridging contact 176 (Figure 9) cooperates with a pair of stationary contacts 186 and 188. Each of stationary contacts 178 through 188 are then brought out to terminal positions 190 through 200 respectively as seen in Figures 7 and 9 where terminals 194 and 196 are shown in Figure 11.

The spring 170 and crank arm 168 are so arranged that the bridging contacts 172 nad 176 are normally in an open position since spring 204 biases crank 168 in a counter-clockwise direction as shown in Figure 1. In this position, the bridging contact 174 is in a normally closed position and is moved to an open position when crank 168 is rotated clockwise. Note that the clockwise rotation of crank 168 is normally prevented by the engagement of its opposite end 202 with the limit switch actuator 124 as seen in Figure 1 and as will be described more fully hereinafter.

An overtravel spring 170 is associated with carrier 164 and crank arm 168 so that when crank arm 168 is rotated counter-clockwise, as shown in Figure 11, variations in its position will be compensated for by the elasticity of spring 170 while contact carrier 164 remains positioned against its upward stop in upper housing 150.

The lockout relay mechanism 160 of Figure 1 is further illustrated in Figures 7, 9, 10 and 12 and is comprised of a lower magnetic structure 206 which is supported from the bottom housing 152 and a cooperating upper magnetic structure 208 which is movably supported within the lower housing 152. Calibration biasing springs 212 and 214 (Figure 12) are positioned between the upper and lower magnetic housings 206 and 208 to bias them to predetermined relative position. The center legs of magnets 206 and 208 are then encompassed by an energizing winding 216 which is energized from the control circuit in the manner to be described hereinafter. Upper magnet 208 further carries a contact carrier 218 as seen in Figures 1, 9 and 12 where the contact carrier 218 flexibly carries bridging contacts 220 and 222, which cooperate with stationary contacts 224—226 and 228—230 respectively. The bridging contact 222 is in a normally engaged position while the bridging contact 220 is in a normally disengaged position as seen in Figures 8, 10 and 12. Clearly, when coil 216 in energized bridging contact 222 will move to a disengaged position while bridging contact 220 will move downwardly to an engaged position since upper marget 208 will move downward.

The latch release mechanism 162 is set forth in Figures 1, 9, 10 and 13 and comprises a lower magnet structure 234 and upper magnet structure 236 each of which are supported in the lower housing 152 and upper magnet structure 236 is biased to a predetermined position by biasing springs 238 and 240. An energizing coil 242 then encompasses the center legs of magnetic structures 236 and 238 in the usual manner. The upper magnetic structure 236 pivotally carries a pair of operating links 244 on the extending pivotal link 246. A central portion of links 244 is pivotally mounted on a fixed pivot 248 (Figures 1 and 9) and links 244 extended to pick up a portion of plunger 120. More specifically, link 244 is connected to member 250 (Figures 1 and 13) which is threadably carried by plunger 120 by a pivotal connection including pin 252. A biasing spring 254 is then positioned between member 250 and a portion of the upper housing 150 so as to bias plunger 120 downwardly. The plunger 120 is then calibrated by rotating screw head 256 which is threadedly engaged with member 250 so that the normal position of the top of plunger 120 is controlled independently of the position of link 244.

A manual operating means for plunger 120 is comprised of operating link 258 which is pivoted at a fixed pivot 260 and is engageable with pin 246. Thus a motion of operating link 258 to drive pin 246 downwardly will cause pin 252 and thus the plunger 120 to be moved upwardly.

The limit switch actuator 124 is positioned within the upper housing 150 as best seen in Figures 1 and 9 to be guided within a cooperating notch in the housing and provides a force transmitting link between the cam surface of crank arm 78 and the limit switch 158.

The manner in which the above described components are preferably connected in the control circuit is set forth in Figure 14. Referring now to Figure 14, a source of control voltage which is either A.-C. or D.-C. is provided at terminals 262 and 264. The charging motor 50 is in a first circuit and is connected in series with a control power switch 266 and limit switch stationary contacts 178 and 180 (with bridging contact 172 in its normally closed position) and the auxiliary switch contact 268. Auxiliary switch contact 268 is a so-called "b" type switch and is associated with the circuit breaker movable contact as indicated by the dotted lines from the schematically illustrated circuit breaker 270 so that it is closed when the circuit breaker contacts are open and is opened when the circuit breaker contacts are closed. A second circuit is provided and includes remote close contact 272 and local close contact 274. These contacts are connected in parallel and control the discharge of the closing springs to close the circuit breaker such as circuit breaker 270. Each of remote close contacts 272 and local close contact 274 are connected in series with the latch release coil 242, normally open limit switch contact 174—182—184, normally closed lockout contact 222—228—230 of the lockout relay 160 and a second normally closed "b" contact 276 which is also operable dependent upon the position of the contacts of circuit breaker 270.

The close switches 272 and 274 are further connected in series with a third circuit which includes lockout relay coil 216, and the parallel connected contacts including normally closed limit switch contact 176—186—188 and normally open lockout contact 220—224—226.

The dependence of the various relay contacts upon their respective operating coils is illustrated in Figure 14 by means of the dotted lines. Thus, the lockout coil 216 is schematically illustrated as being associated with movable contacts 220 and 222. In a similar manner, the circuit breaker 270 closing springs are schematically illustrated as maintaining movable contacts 172 and 176 in their normally closed position and movable contact 174 in its disengaged position when the circuit breaker charging springs are discharged.

Control mechanism operation

The closing operation is best understood from Figures 1 and 14, and is initiated by closing the control power switch 266. At this time, it will be assumed that the closing springs 48 of Figure 1 are discharged and that the circuit breaker contacts are open so that contact 172 is in an engaged position and the contact 268 is closed. Accordingly the motor 50 will be energized so that disk 78 will rotate in the manner heretofore described from the position of Figure 4 to the latched position of Figure 1. Once the latch position of Figure 1 is reached, limit switch actuator 124 moves off the end of the cam surface of crank 78 at portion 79 so that biasing spring 204 will pull end 202 of limit switch crank 168 upwardly. This will cause the shaft of crank 168 to rotate so that the end of the shaft seen in Figure 11 will be driven downwardly and carry contact carrier 164 of limit switch 158 downwardly. Accordingly, limit switch contacts 172 and 176 will disengage switch 176 while limit switch contact 174 moves to an engaged position. The disengagement of limit switch contact 172 which controls the energization of motor 50 to charge the spring closing mechanism will then stop the charging operation in the position of Figure 1. Since the driving pawl 64 is operating within the surface of missing tooth 77 when the motor is de-energized, continued rotation of motor 50 while stopping will have no effect on the charging mechanism. Accordingly the charging position of the mechanism is independent of any characteristic of motor 50.

In order to now transfer the stored energy of spring 48 to the closing mechanism, the remote close contact or the local close contact (which may be of the momentary type) is closed. Since the springs are charged and the limit switch is operated, normally open limit switch contact 174 is closed so that latch release coil 242 is energized through the limit switch contact 174, normally closed contact 222 of the lockout structure and the "b" switch 276 which is closed since the circuit breaker contacts are still open. The energization of coil 242 will energize magnetic structures 234 and 236 so that structure 236 will be drawn downward against the force of biasing springs 238 and 240 of Figure 13. This downward motion will cause link 244 to rotate in a clockwise direction about pivot 248 (Figure 1) so that pin 252 and plunger 120 attached thereto will be driven upwardly. The upward movement of plunger 120 will then operate secondary close latch 104 in the manner heretofore described so that the stored energy of springs 48 is transmitted to the circuit breaker contacts through the first stage close cam 86.

Once the circuit breaker contacts are closed, the "b" switches 268 and 276 are disengaged so as to prevent reenergization of motor 50 and to de-energize latch release coil 242 and allow plunger 120 to return to its inactive position under the influence of biasing spring 254. Therefore, the secondary close latch 104 and primary close latch 100 may be subsequently reset. Note that as the circuit breaker closes, the limit switch contacts 172, 174 and 176 will return to their normal position of Figure 14 since the cam surface of link 78 is brought around to the position of Figure 2 so as to depress the limit switch actuator 124.

It is to be noted that the springs 48 may be discharged independently of close switches 272 and 274 by means of manually operable lever 258. Thus, once the springs are charged, lever 258 of Figure 1 may be rotated counter-clockwise so as to cause magnetic structure 236 to be depressed exactly in the manner at which it occurs under electrical operation whereby plunger 120 is moved up to defeat latch 104. The lockout feature of the control circuit will operate to provide a positive de-energization of the latch release circuit after any single operation of this circuit and so long as contacts 272 and 274 are closed. During the closing of limit switch contact 176 after the circuit breaker is closed, the lockout coil 216 will be energized through the closed contact 176. Note that contact 176 was maintained open previous to the closing of the circuit breaker and after the motor 50 was de-energized. The energization of lockout coil 216 will cause its upper magnetic structure 208 to be moved downwardly so as to open normally closed contact 222 and close normally open contact 220. The closing of contact 220 will operate to seal the relay in its energized position since it completes a circuit through the lockout coil 216 across the energizing terminals 262 and 264. Accordingly, contact 222 will be sealed in its open position to thereby positively prevent a subsequent energization of latch release coil 242 and a false closing cycle.

In the event that the circuit breaker is to be instantaneously charged after the circuit breaker contacts are closed, it is only necessary to remove the "b" type contact 268. With this adjustment, the contact closing will proceed in the manner described above, but when limit switch contact 172 recloses after the closing of the circuit breaker, motor 50 will be re-energized so as to re-charge springs 48 to the position of Figure 1. Note that the novel lockout operation will also follow for the automatic reset type operation since the lockout coil 216 will defeat the latch release circuit through contact 222.

The novel control scheme of Figure 14 is seen to provide a positive prevention of re-energization of latch release coil 242 under all conditions where control power is available even if the close contacts 272 and 274 are held closed and the charging mechanism is automatically recharged after operation.

The system further prevents a false closing cycle even if the control power is lost after closing of the circuit breaker to defeat energization of lockout coil 216 and the circuit opens on a fault with a subsequent return of control power which would operate the latch release coil 242. In this situation, the interval of time required for resetting the latches 100 and 104 as well as the collapsible mechanism of Figure 3 is longer than the time required to reset the lockout relay including coil 216. Thus, before the breaker is ready to reclose, the contact 222 will be disengaged to defeat the closing operation. But even if the electrical lockout is not reset in time, the resetting operation of collapsible link 128 of Figure 3 may be made long enough to have the discharge of the springs take place during the toggle operation when it is impossible to reclose the breaker.

A second embodiment of the novel mechanism is shown in Figure 15 which is identical to Figure 14 except that the manual trip lever has its function performed by the local close switch 160 shown in Figure 2a. The local close contact 274 of Figure 14 is eliminated and the control power lockout switch 280 is added in the motor control circuit. The control power lockout switch 280 is contained within manually operable switch 160 of Figure 2a is as schematically illustrated in Figure 15 and is spring loaded by spring 282 so as to be biased to an engaged position. In operation, when the button 160 is depressed, lever 164 is rotated as described above as to defeat the secondary close latch 104 and thus close the circuit breaker. At the same time, the contact 280 moves to a disengaged position (when it is operated to discharge the springs) so that as the close button 160 is held closed, the motor will not recharge the springs to carry through another closing cycle. Releasing button 160 will allow switch contacts 280 to close and latches 100 and 104 to reset whereby the normal charging operation may be initiated as described in Figure 4.

Although I have described preferred embodiments of my novel invention, many variations and modifications will now be obvious to those skilled in the art, and I prefer therefore to be limited not by the specific disclosure herein but only by the appended claims.

I claim:

1. A spring closing mechanism for the movable contact of a circuit breaker; said spring closing mechanism comprising a chargeable spring, a latch means, a charging mechanism for said spring, and an energy transferring mechanism; said spring having a first portion thereof operatively connected to a relatively fixed member and a second portion thereof operatively connectible to said charging mechanism; said charging mechanism including an operating means, a reciprocating member and an output member movable in only a first direction; said operating means being operatively connected to said reciprocal member to impart reciprocal motion thereto; said reciprocal member being operatively connected to said output member to drive said output member in only said first direction during a first motion of said reciprocal member and being incapable of driving said output member during movement reciprocal to said first motion; said output member being operatively connected to said second portion of said spring and moving said second portion of said spring to a charged position during operation of said output member in said first direction under the influence of said reciprocating member; said output member being further constructed to be movable in said first direction independently of said reciprocal member after said output member reaches a first predetermined position; said latch means being positioned to latch said output member in a second predetermined position which is beyond said first predetermined position when said output member reaches said second predetermined position; said latch means being defeatable to permit discharge of said spring independently of said reciprocating member; said energy transmitting means being operatively connected between said second portion of said spring and said movable contact; said energy transferring means transferring the stored energy of said spring to said movable contact when said spring discharges.

2. A spring closing mechanism for the movable contact of a circuit breaker; said spring closing mechanism comprising a chargeable spring, a latch means, a charging mechanism for said spring, and an energy transferring mechanism; said spring having a first portion thereof operatively connected to a relatively fixed member and a second portion thereof operatively connectible to said charging mechanism; said charging mechanism including an operating means, a reciprocating member and an output member movable in only a first direction; said operating means being operatively connected to said reciprocal member to impart reciprocal motion thereto; said reciprocal member being operatively connected to said output member to drive said output member in only said first direction during a first motion of said reciprocal member and being incapable of driving said output member during movement reciprocal to said first motion; said output member being operatively connected to said second portion of said spring and moving said second portion of said spring to a charged position during operation of said output member in said first direction under the influence of said reciprocating member; said output member being further constructed to be movable in said first direction independently of said reciprocal member after said output member reaches a first predetermined position; said latch means being positioned to latch said output member in a second predetermined position which is beyond said first predetermined position when said output member reaches said second predetermined position; said latch means being defeatable to permit discharge of said spring independently of said reciprocating member; said energy transmitting means being operatively connected between said second portion of said spring and said movable contact; said energy transferring means transferring the stored energy of said spring to said movable contact when said spring discharges; said operating means including a motor having an output crank arm for reciprocally driving said reciprocating member.

3. A spring closing mechanism for the movable contact of a circuit breaker; said spring closing mechanism comprising a chargeable spring, a latch means, a charging mechanism for said spring, and an energy transferring mechanism; said spring having a first portion thereof operatively connected to a relatively fixed member and a second portion thereof operatively connectible to said charging mechanism; said charging mechanism including an operating means, a reciprocating member and an output member movable in only a first direction; said operating means being operatively connected to said reciprocal member to impart reciprocal motion thereto; said reciprocal member being operatively connected to said output member to drive said output member in only said first direction during a first motion of said reciprocal member and being incapable of driving said output member during movement reciprocal to said first motion; said output member being operatively connected to said second portion of said spring and moving said second portion of said spring to a charged position during operation of said output member in said first direction under the influence of said reciprocating member; said output member being further constructed to be movable in said first direction independently of said reciprocal member after said output member reaches a first predetermined position; said latch means being positioned to latch said output member in a second predetermined position which is beyond said first predetermined position when said output member reaches said second predetermined position; said latch means being defeatable to permit discharge of said spring independently of said reciprocating member; said energy transmitting means being operatively connected between said second portion of said spring and said movable contact; said energy transferring means transferring the stored energy of said spring to said movable contact when said spring discharges; said operating means comprising a manual operating lever operatively connectible to said reciprocating member.

4. A spring closing mechanism for the movable contact of a circuit breaker; said spring closing mechanism comprising a chargeable spring, a latch means, a charging mechanism for said spring, and an energy transferring mechanism; said spring having a first portion thereof operatively connected to a relatively fixed member and a second portion thereof operatively connectible to said charging mechanism; said charging mechanism including an operating means, a reciprocating member and an output member movable in only a first direction; said operating means being operatively connected to said reciprocal member to impart reciprocal motion thereto; said reciprocal member being operatively connected to said output member to drive said output member in only said first direction during a first motion of said reciprocal member and being incapable of driving said output member during movement reciprocal to said first motion; said output member being operatively connected to said second portion of said spring and moving said second portion of said spring to a charged position during operation of said output member in said first direction under the influence of said reciprocating member; said output member being further constructed to be movable in said first direction independently of said reciprocal member after said output member reaches a first predetermined position; said latch means being positioned to latch said output member in a second predetermined position which is beyond said first predetermined position when said output member reaches said second predetermined position; said latch means being defeatable to permit discharge of said spring independently of said reciprocating member; said energy transmitting means being operatively connected between said second portion of said spring and said movable contact; said energy transferring means transferring the stored energy of said spring to said movable contact when said spring discharges; said operating means comprising a manual operating lever operatively connectible to said reciprocating member; said reciprocating member being further adapted to receive a manually operable operating lever for imparting reciprocal motion to said reciprocating member independently of said motor.

5. A spring closing mechanism for the movable contact of a circuit breaker; said spring closing mechanism comprising a chargeable spring, a latch means, a charging mechanism for said spring, and an energy transferring mechanism; said spring having a first portion thereof operatively connected to a relatively fixed member and a second portion thereof operatively connectible to said charging mechanism; said charging mechanism including an operating means, a reciprocating member and an output member movable in only a first direction; said operating means being operatively connected to said reciprocal member to impart reciprocal motion thereto; said reciprocal member being operatively connected to said output member to drive said output member in only said first direction during a first motion of said reciprocal member and being incapable of driving said output member during movement reciprocal to said first motion; said output member being operatively connected to said second portion of said spring and moving said second portion of said spring to a charged position during operation of said output member in said first direction under the influence of said reciprocating member; said output member being further constructed to be movable in said first direction independently of said reciprocal member after said output member reaches a first predetermined position; said latch means being positioned to latch said output member in a second predetermined position which is beyond said first predetermined position when said output member reaches said second predetermined position; said latch means being defeatable to permit discharge of said spring independently of said reciprocating member; said energy transmitting means being operatively connected between said second portion of said spring and said movable contact; said energy transferring means transferring the stored energy of said spring to said movable contact when said spring discharges; said operating means comprising a manual operating lever operatively connectible to said reciprocating member; and defeating means for said second portion of said spring; said defeating means being movable to defeat motion of said second portion of said spring after said output member is moved to said second predetermined position; said closing mechanism being movable through its closing cycle by manual operation of said reciprocal member independently of said spring when said spring is defeated by said defeating means.

6. A spring closing mechanism for the movable contact of a circuit breaker; said spring closing mechanism comprising a chargeable spring, a latch means, a charging mechanism for said spring, and an energy transferring mechanism; said spring having a first portion thereof operatively connected to a relatively fixed member and a second portion thereof operatively connectible to said charging mechanism; said charging mechanism including an operating means, a reciprocating member and an output member movable in only a first direction; said operating means being operatively connected to said reciprocal member to impart reciprocal motion thereto; said reciprocal member being operatively connected to said output member to drive said output member in only said first direction during a first motion of said reciprocal member and being incapable of driving said output member during movement reciprocal to said first motion; said output member being operatively connected to said second portion of said spring and moving said second portion of said spring to a charged position during operation of said output member in said first direction under the influence of said reciprocating member; said output member being further constructed to be movable in said first direction independently of said reciprocal member after said output member reaches a first predetermined position; said latch means being positioned to latch said output member in a second predetermined position which is beyond said first predetermined position when said output member reaches said second predetermined position; said latch means being defeatable to permit discharge of said spring independently of said reciprocating member; said energy transmitting means being operatively connected between said second portion of said spring and said movable contact; said energy transferring means transferring the stored energy of said spring to said movable contact when said spring discharges; said output member including a ratchet portion movable with respect to a holding pawl; said reciprocating member carrying a driving pawl for driving said ratchet portion of said output member only in said first direction.

7. A spring closing mechanism for the movable contact of a circuit breaker; said spring closing mechanism comprising a chargeable spring, a latch means, a charging mechanism for said spring, and an energy transferring mechanism; said spring having a first portion thereof operatively connected to a relatively fixed member and a second portion thereof operatively connectible to said charging mechanism; said charging mechanism including an operating means, a reciprocating member and an output member movable in only a first direction; said operating means being operatively connected to said reciprocal member to impart reciprocal motion thereto; said reciprocal member being operatively connected to said output member to drive said output member in only said first direction during a first motion of said reciprocal member and being incapable of driving said output member during movement reciprocal to said first motion; said output member being operatively connected to said second portion of said spring and moving said second portion of said spring to a charged position during operation of said output member in said first direction under the influence of said reciprocating member; said output member being further constructed to be movable in said first direction independently of said reciprocal member after said output member reaches a first predetermined position; said latch means being positioned to latch said output member in a second predetermined position which is beyond said first predetermined position when said output member reaches said second predetermined position; said latch means being defeatable to permit discharge of said spring independently of said reciprocating member; said energy transmitting means being operatively connected between said second portion of said spring and said movable contact; said energy transferring means transferring the stored energy of said spring to said movable contact when said spring discharges; said output member including a ratchet portion movable with respect to a holding pawl; said reciprocating member carrying a driving pawl for driving said ratchet portion of said output member only in said first direction; said ratchet portion having a missing tooth portion; said missing tooth portion being engaged by said driving pawl when said output member is moved to and latched in said second predetermined position whereby continued operation of said reciprocating member does not move said output member.

8. A spring closing mechanism for the movable contact of a circuit breaker; said spring closing mechanism comprising a chargeable spring, a latch means, a charging mechanism for said spring, and an energy transferring mechanism; said spring having a first portion thereof operatively connected to a relatively fixed member and a second portion thereof operatively connectible to said charging mechanism; said charging mechanism including an operating means, a reciprocating member and an output member movable in only a first direction; said operating means being operatively connected to said reciprocal member to impart reciprocal motion thereto; said reciprocal member being operatively connected to said output member to drive said output member in only said first direction during a first motion of said reciprocal member and being incapable of driving said output member during movement reciprocal to said first motion; said output member being operatively connected to said second portion of said spring and moving said second portion of said spring to a charged position during operation of said output member in said first direction under the influence of said reciprocating member; said output member being further constructed to be movable in said first direction independently of said reciprocal member after said output member reaches a first predetermined position; said latch means being positioned to latch said output member in a second predetermined position which is beyond said first predetermined position when said output member reaches said second predetermined position; said latch means being defeatable to permit discharge of said spring independently of said reciprocating member; said energy transmitting means being operatively connected between said second portion of said spring and said movable contact; said energy transferring means transferring the stored energy of said spring to said movable contact when said spring discharges; said operating means including a motor having an output crank arm for reciprocally driving said reciprocating member; said output member including a ratchet portion movable with respect to a holding pawl; said reciprocating member carrying a driving pawl for driving said ratchet portion of said output member only in said first direction; said ratchet portion having a missing tooth portion; said missing tooth portion being engaged by said driving pawl when said output member is moved to and latched in said second predetermined position whereby continued operation of said reciprocating member does not move said output member.

9. A spring closing mechanism for the movable contact of a circuit breaker; said spring closing mechanism comprising a chargeable spring, a latch means, a charging mechanism for said spring, and an energy transferring mechanism; said spring having a first portion thereof operatively connected to a relatively fixed member and a second portion thereof operatively connectible to said charging mechanism; said charging mechanism including an operating means, a reciprocating member and an output member movable in only a first direction; said operating means being operatively connected to said reciprocal member to impart reciprocal motion thereto; said reciprocal member being operatively connected to said output member to drive said output member in only said first direction during a first motion of said reciprocal member and being incapable of driving said output member during movement reciprocal to said first motion; said output member being operatively connected to said second portion of said spring and moving said second portion of said spring to a charged position during operation of said output member in said first direction under the influence of said reciprocating member; said output member being further constructed to be movable in said first direction independently of said reciprocal member after said output member reaches a first predetermined position; said latch means being positioned to latch said output member in a second predetermined position which is beyond said first predetermined position when said output member reaches said second predetermined position; said latch means being defeatable to permit discharge of said spring independently of said reciprocating member; said energy transmitting means being operatively connected between said second portion of said spring and said movable contact; said energy transferring means transferring the stored energy of said spring to said movable contact when said spring discharges; said operating means including a motor having an output crank arm for reciprocally driving said reciprocating member; a limit switch; an energizing circuit for said motor; said limit switch being connected to control the energization of said motor by said energizing circuit; said limit switch being positioned to be operated by a portion of said operating mechanism when said output member reaches said second predetermined position to de-energize said motor.

10. A spring closing mechanism for the movable contact of a circuit breaker; said spring closing mechanism comprising a chargeable spring, a latch means, a charging mechanism for said spring, and an energy transferring mechanism; said spring having a first portion thereof operatively connected to a relatively fixed member and a second portion thereof operatively connectible to said charging mechanism; said charging mechanism including an operating means, a reciprocating member and an output member movable in only a first direction; said operating means being operatively connected to said reciprocal member to impart reciprocal motion thereto; said reciprocal member being operatively connected to said output member to drive said output member in only said first direction during a first motion of said reciprocal member and being incapable of driving said output member during movement reciprocal to said first motion; said output member being operatively connected to said second portion of said spring and moving said second portion of said spring to a charged position during operation of said output member in said first direction under the influence of said reciprocating member; said output member being further constructed to be movable in said first direction independently of said reciprocal member after said output member reaches a first predetermined position; said latch means being positioned to latch said output member in a second predetermined position which is beyond said first predetermined position when said output member reaches said second predetermined position; said latch means being defeatable to permit discharge of said spring independently of said reciprocating member; said energy transmitting means being operatively connected between said second portion of said spring and said movable contact; said energy transferring means transferring the stored energy of said spring to said movable contact when said spring discharges; said operating means including a motor having an output crank arm for reciprocally driving said reciprocating member; said output member including a ratchet portion movable with respect to a holding pawl; said reciprocating member carrying a driving pawl for driving said ratchet portion of said output member only in said first direction; said ratchet portion having a missing tooth portion; said missing tooth portion being engaged by said driving pawl when said output member is moved to and latched in said second predetermined position whereby continued operation of said reciprocating member does not move said output member; a limit switch; an energizing circuit for said motor; said limit switch being connected to control the energization of said motor by said energizing circuit; said limit switch being positioned to be operated by a portion of said operating mechanism when said output member reaches said second predetermined position to de-energize said motor.

11. A spring closing mechanism for the movable contact of a circuit breaker; said spring closing mechanism comprising a chargeable spring, a latch means, a charging mechanism for said spring, and an energy transferring mechanism; said spring having a first portion thereof operatively connected to a relatively fixed member and a second portion thereof operatively connectible to said charging mechanism; said charging mechanism including an operating means, a reciprocating member and an output member movable in only a first direction; said operating means being operatively connected to said reciprocal member to impart reciprocal motion thereto; said reciprocal member being operatively connected to said output member to drive said output member in only said first direction during a first motion of said reciprocal member and being incapable of driving said output member during movement reciprocal to said first motion; said output member being operatively connected to said second portion of said spring and moving said second portion of said spring to a charged position during operation of said output member in said first direction under the influence of said reciprocating member; said output member being further constructed to be movable in said first direction independently of said reciprocal member after said output member reaches a first predetermined position; said latch means being positioned to latch said output member in a second predetermined position which is beyond said first predetermined position when said output member reaches said second predetermined position; said latch means being defeatable to permit discharge of said spring independently of said reciprocating member; said energy transmitting means being operatively connected between said second portion of said spring and said movable contact; said energy transferring means transferring the stored energy of said spring to said movable contact when said spring discharges; said operating means including a motor having an output crank arm for reciprocally driving said reciprocating member; a limit switch; an energizing circuit for said motor; said limit switch being connected to control the energization of said motor by said energizing circuit; said limit switch being positioned to be operated by a portion of said operating mechanism when said output member reaches said second predetermined position to de-energize said motor; said portion of said operating mechanism for controlling said limit switch comprising a cam surface carried by said output member.

12. A spring closing mechanism for the movable contact of a circuit breaker; said spring closing mechanism comprising a chargeable spring, a latch means, a charging mechanism for said spring, and an energy transferring mechanism; said spring having a first portion thereof operatively connected to a relatively fixed member and a second portion thereof operatively connectible to said charging mechanism; said charging mechanism including an operating means, a reciprocating member and an output member movable in only a first direction; said operating means being operatively connected to said reciprocal member to impart reciprocal motion thereto; said reciprocal member being operatively connected to said output member to drive said output member in only said first direction during a first motion of said reciprocal member and being incapable of driving said output member during movement reciprocal to said first motion; said output member being operatively connected to said second portion of said spring and moving said second portion of said spring to a charged position during operation of said output member in said first direction under the influence of said reciprocating member; said output member being further constructed to be movable in said first direction independently of said reciprocal member after said output member reaches a first predetermined position; said latch means being positioned to latch said output member in a second predetermined position which is beyond said first predetermined position when said output member reaches said second predetermined position; said latch means being defeatable to permit discharge of said spring independently of said reciprocating member; said energy transmitting means being operatively connected between said second portion of said spring and said movable contact; said energy transferring means transferring the stored energy of said spring to said movable contact when said spring discharges; said latch means including a primary latch for latching a portion of said output member and a secondary latch for maintaining said primary latch in a latching position; said primary and secondary latches forming a two stage latch system for latch load reduction.

13. A spring closing mechanism for the movable contact of a circuit breaker; said spring closing mechanism comprising a chargeable spring, a latch means, a charging mechanism for said spring, and an energy transferring mechanism; said spring having a first portion thereof operatively connected to a relatively fixed member and a second portion thereof operatively connectible to said charging mechanism; said charging mechanism including an operating means, a reciprocating member and an output member movable in only a first direction; said operating means being operatively connected to said reciprocal member to impart reciprocal motion thereto; said reciprocal member being operatively connected to said output member to drive said output member in only said first direction during a first motion of said reciprocal member and being incapable of driving said output member during movement reciprocal to said first motion; said output member being operatively connected to said second portion of said spring and moving said second portion of said spring to a charged position during operation of said output member in said first direction under the influence of said reciprocating member; said output member being further constructed to be movable in said first direction independently of said reciprocal member after said output member reaches a first predetermined position; said latch means being positioned to latch said output member in a second predetermined position which is beyond said first predetermined position when said output member reaches said second predetermined position; said latch means being defeatable to permit discharge of said spring independently of said reciprocating member; said energy transmitting means being operatively connected between said second portion of said spring and said movable contact; said energy transferring means transferring the stored energy of said spring to said movable contact when said spring discharges; said output member including a ratchet portion movable with respect to a holding pawl; said reciprocating member carrying a driving pawl for driving said ratchet portion of said output member only in said first direction; said ratchet portion having a missing tooth portion; said missing tooth portion being engaged by said driving pawl when said output member is moved to and latched in said second predetermined position whereby continued operation of said reciprocating member does not move said output member; said output member further including an actuating crank; said ratchet portion of said output member being carried on the periphery of said actuating crank; said second portion of said spring being pivotally connected to a radial portion of said actuating crank.

14. A charging sysem for a spring; said spring having a first portion operatively connected to a relatively fixed structure and a second portion operatively connected to a load; said charging system including an operating means, a charging mechanism and a latch means; a first and second connecting means for operatively connecting said charging mechanism to said second portion of said spring and said operating means respectively; said charging mechanism being movable through a first distance to a predetermined position under the influence of said operating means; said second portion of said spring being moved to a fully charged position when said charging mechanism reaches said predetermined position; said latch means being positioned to latch said charging mechanism in said predetermined position when said predetermined position is reached; said second connecting means for connecting said charging mechanism to said operating means being constructed to render said charging mechanism movable independently of said operating means when said predetermined position is reached.

15. A charging system for a spring; said spring having a first portion operatively connected to a relatively fixed structure and a second portion operatively connected to a load; said charging system including an operating means; a charging mechanism and a latch means; a first and second connecting means for operatively connecting said charging mechanism to said second portion of said spring and said operating means respectively; said charging mechanism being movable through a first distance to a predetermined position under the influence of said operating means; said second portion of said spring being moved to a fully charged position when said charging mechanism reaches said predetermined position; said latch means being positioned to latch said charging mechanism in said predetermined position when said predetermined position is reached; said second connecting means for connecting said charging mechanism to said operating means being constructed to render said charging mechanism movable independently of said operating means when said predetermined position is reached; said operating means comprising an electrically energizable means.

16. A charging system for a spring; said spring having a first portion operatively connected to a relatively fixed structure and a second portion operatively connected to a load; said charging system including an operating means; a charging mechanism and a latch means; a first and second connecting means for operatively connecting said charging mechanism to said second portion of said spring and said operating means respectively; said charging mechanism being movable through a first distance to a predetermined position under the influence of said operating means; said second portion of said spring being moved to a fully charged position when said charging mechanism reaches said predetermined position; said latch means being positioned to latch said charging mechanism in said predetermined position when said predetermined position is reached; said second connecting means for connecting said charging mechanism to said operating means being constructed to render said charging mechanism movable independently of said operating means when said predetermined position is reached; said charging mechanism including a reciprocally movable pawl operatively driven by said operating means and a cooperating ratchet; said cooperating ratchet being operatively connected to said second portion of said spring and being movable toward said predetermined position under the influence of said driving pawls, and thereafter being movable independently of said driving pawl and under the influence of said spring when said latch means is defeated.

References Cited in the file of this patent

UNITED STATES PATENTS

| 2,486,602 | Jensen | Nov. 1, 1949 |
| 2,868,330 | Caswell | Jan. 13, 1959 |